UNITED STATES PATENT OFFICE.

HEINRICH SCHOLZ, OF BERLIN, GERMANY, ASSIGNOR, BY MESNE ASSIGNMENTS, TO THE FIRM OF KAUTSCHUKGESELLSCHAFT SCHÖN & COMPANY, OF HARBURG-ON-THE-ELBE, GERMANY.

PROCESS OF OBTAINING PURE CAOUTCHOUC, GUTTA-PERCHA, AND THE LIKE.

No. 924,584.  Specification of Letters Patent.  Patented June 8, 1909.

Application filed February 27, 1906. Serial No. 303,215.

*To all whom it may concern:*

Be it known that I, HEINRICH SCHOLZ, a subject of the King of Prussia, residing at Berlin, in the Kingdom of Prussia and German Empire, have invented certain new and useful Improvements in Processes of Obtaining Pure Caoutchouc, Gutta-Percha, and the Like, of which the following is a specification.

My invention relates to a process of treating raw materials containing caoutchouc, gutta-percha or balata, for the purpose of obtaining pure caoutchouc, gutta percha, etc. free from resin, and also securing resins or resinous materials as by-products.

The essential feature of the invention is, that the raw material (especially such as hitherto could not be purified by washing on account of the large percentage of resin or for other reasons) is either directly or after the usual first cleaning (and if necessary after comminution) treated with anilin, a noninflammable material, or equivalent alkylized products, the soluble part with the solvent being then separated from the insoluble part. The latter consists of pure caoutchouc, while in the solution are found the resinous oily and waxy ingredients of the raw material, and if the latter should contain gutta percha, this also is found therein. The gutta percha can be separated from the solution by cooling the latter, or by a precipitant (such as water, alcohols, acetone, etc.) and the resins can be separated from the anilin by distillation by means of steam or the like.

I will now proceed to give some practical examples of the manner in which the process can be carried out.

Example 1: 10 kilograms of one of the poor quality gums of commerce are boiled for some two hours with 15 kilograms of anilin with the addition of 5 kilograms of water as for instance of a reflux-cooler. After boiling, the residue is separated (if desired, by pressure) from the solution in well-known manner, and is then washed and dried. The solution, as above described, is then submitted to steam distillation, whereby the resins remain behind, the anilin passing over with the steam. A secondary advantage of adding water is that salts, vegetable juices, etc. are washed out of the raw material, such as would not be removed by the resin solvents.

Example 2: To 10 kilograms of the highly resinous raw material known in the trade as "Flakes," "Accra Paste," "Euphortia," or "Almeidina," which hitherto could only be worked by melting, 20 kilograms of anilin are added and the whole boiled for some two hours in the reflux-cooler. Care must be taken that the temperature does not rise to or near the melting point of the rubber. For this reason it is of advantage either to work with a water-bath, or to add to the anilin such liquids of low boiling point as do not dissolve caoutchouc, which act as precipitants, and do not allow the temperature to rise above the desired limit. For this purpose the rubber precipitants (water, alcohols, acetone etc.) are particularly suitable. After boiling, the residue from the solution is separated in the manner described under Example 1, and the anilin separated by steam distillation from the resins and thus recovered.

Example 3: 10 kilograms of New Guinea raw guttapercha, hitherto of little value on account of the large percentage of resir contained, are treated with 25 kilograms of anilin at a suitable temperature, as in the preceding example. From the solution obtained the gutta is separated by intense coolings or by the addition of one or more of the already mentioned precipitants, while the resinous and waxy ingredients remain in solution. From the latter the precipitants are first removed (unless water has been employed as such) in well-known manner by distillation, and the resin remaining in the anilin then separated by steam distillation. Or the precipitant may be added to the anilin at the commencement and boiled therewith.

Example 4: 10 kilograms of washed raw rubber containing an average, or high percentage of resin, such, for instance, as Madagascar, are boiled for say an hour with 10 kilograms of anilin and 10 kilograms of water, in the place of which other precipitants may be used. The various substances are separated from each other as in the above cited examples.

The pure rubber obtained in this manner is perfectly free from resin and thus offers the best conditions for thorough vulcanization, since the resins, at the vulcanizing temperature, melting, take up sulfur, causing a disturbing reaction in the rubber, and sinter and seriously affect the homogeneity of the material.

What I do claim as my invention and desire to secure by Letters Patent, is—

1. The process of obtaining pure caoutchouc and gutta from crude rubber gums and the like containing resin, which consists in dissolving the resin with anilin, or its alkylized substitution products, while maintaining the temperature below the melting point of rubber, and then separating the pure caoutchouc and gutta from the solution.

2. The process of obtaining pure caoutchouc and gutta from crude rubber gums and the like, containing resin, which consists in dissolving the resin with anilin or its alkylized substitution products, and adding to the anilin, an indifferent agent for the purpose of keeping down the temperature, and then separating the pure caoutchouc and gutta from the solution.

In testimony whereof I have affixed my signature in presence of two witnesses.

HEINRICH SCHOLZ.

Witnesses:
BERNHARD GRAETZ.
KARL GARZ.